United States Patent [19]

Hill

[11] Patent Number: 4,748,808

[45] Date of Patent: Jun. 7, 1988

[54] FLUID POWERED MOTOR-GENERATOR APPARATUS

[76] Inventor: Edward D. Hill, #3 Casa Roma La., Key West, Fla. 33040

[21] Appl. No.: 879,442

[22] Filed: Jun. 27, 1986

[51] Int. Cl.$^4$ .............................................. B63H 1/26
[52] U.S. Cl. ........................................ 60/398; 290/54; 416/197 A
[58] Field of Search ......... 60/398; 416/197 A, 197 B; 290/54,55; 417/334

[56] References Cited

U.S. PATENT DOCUMENTS

| | | | |
|---|---|---|---|
| 990,362 | 4/1911 | Kincaid | 416/197 B |
| 2,501,696 | 3/1950 | Souczek | 290/42 |
| 3,922,012 | 11/1975 | Herz | 290/54 X |
| 3,976,396 | 8/1976 | Antogini | 416/117 X |
| 4,019,828 | 4/1977 | Bunzer | 416/197 A X |
| 4,045,148 | 8/1977 | Morin | 417/117 |
| 4,095,422 | 6/1978 | Kurakake | 60/398 |
| 4,262,211 | 4/1981 | Streczyn | 290/54 |
| 4,508,972 | 4/1985 | Willmouth | 290/54 X |

FOREIGN PATENT DOCUMENTS

| | | | |
|---|---|---|---|
| 2813141 | 10/1978 | Fed. Rep. of Germany | 290/54 |
| 910581 | 6/1946 | France | 416/197 A |
| 327062 | 8/1934 | Italy | 416/197 A |
| 224274 | 11/1942 | Switzerland | 417/197 A |

Primary Examiner—William E. Wayner
Attorney, Agent, or Firm—Marshall & Melhorn

[57] ABSTRACT

A fluid powered motor-generator apparatus includes a generator having a power output and a mechanically driven input. A generally streamlined motor body is rotatably mounted to drive the generator input and includes a plurality of radially extending generally V-shaped fins mounted on an outside surface thereof. The fins are mounted on brackets above an outer surface of the motor body and have a convex pointed side facing in the direction of rotation and a concave open side facing in a direction opposite to the direction of rotation. Thus, the action of a stream of fluid on the fins tends to rotate the motor body and drive the generator. If the motor-generator apparatus is mounted in water, the generator can be enclosed in another streamlined body which is anchored to the bed of the body of water. A third streamlined motor body can be attached to the bottom of the generator body with a plurality of radially extending fins oriented to cause it to rotate opposite to the direction of rotation of the first streamlined motor body.

11 Claims, 2 Drawing Sheets

FLUID POWERED MOTOR-GENERATOR APPARATUS

BACKGROUND OF THE INVENTION

This invention relates to an apparatus for converting fluid motion into another form of energy, in general, and to a fluid powered motor-generator apparatus in particular.

Many devices are known for utilizing the energy of moving fluid to generate mechanical or electrical energy. For example, a windmill converts the energy in the wind to mechanical energy by driving a pump or to electrical energy by driving a generator. A water wheel converts the energy in moving water to mechanical or electrical energy in much the same manner as the windmill.

One source of energy is the current flow in a sea or a river. U.S. Pat. No. 2,501,696 discloses a stream turbine which includes a streamlined casing containing gears and a generator driven by an external propeller. A pair of such devices are mounted on a wing with the propellers running in opposite directions. The structure is buoyant and is anchored in a waterway. However, the diameter of the propellers, and thus the generating capacity, is limited by the depth of the waterway.

U.S. Pat. No. 3,922,012 discloses a submersible power generator for use in oceans and rivers. The generator has rotor with a plurality of horizontally radiating spokes mounted in common on a rotatable vertical shaft to drive the same. Each spoke has a hinged impeller blade by which its automatic positioning relative to its spoke maximizes the surface area of the blade acted on by the water current through a part of the rotor displacement and minimizes such surface area through other parts of the displacement, thereby producing the necessary asymmetrical force required to generate rotation.

U.S. Pat. No. 4,045,148 discloses a turbine with a water-driven motive element immersed in a body of water. The motive element includes a disc having a density close to that of water and horizontally disposed with a plurality of cells containing a mixture of liquid and gas. The disc carries on the upper and lower surfaces thereof a plurality of blades which are pivotably movable about a horizontal axis. The blades each have at least one pocket containing a mixture of gas and liquid such that the density of the blades connected to the upper surface of the disc is less than that of water and the density of the blades connected to the lower surface of the disc is greater than that of water. The disc also has a structure which holds the blades in one direction of pivotal movement when the blades reach a vertical position. As a consequence, under the action of water current, the blades are driven to their vertical position and they then effect rotation of the disc which drives an electrical generator system.

U.S. Pat. No. 4,095,422 discloses a vertical-axis composite swinging-blade water wheel for converting the kinetic energy of a substantially horizontal stream of fluid into mechanical energy. Pairs of blade wheels are disposed symmetrically with respect to an output shaft to prevent the composite water wheel from rotating. A plurality of the blade wheels are arranged vertically on the water wheel shaft so that each two adjacent blade wheels deviate from each other through a predetermined angle to prevent inner currents of water between the blades and equalize the fluctuations of the driving torques, thereby improving the efficiency and securing a relatively large power output.

U.S. Pat. No. 4,262,211 discloses a liquid storage device and energy generator including a plurality of floating, elongate, liquid storage containers arranged in circular fashion for rotation about a centrally positioned generator. The containers may be floated in relatively shallow waters which move at differential speeds to cause the entire pattern of storage containers to rotate and produce electrical energy.

SUMMARY OF THE INVENTION

The present invention relates to a submersible fluid powered motor-generator apparatus. An upper saucer-shaped body has a plurality of radially extending fins attached to an outer surface thereof. The fins are V-shaped in cross section and all face in the same direction. The body is rotatably mounted on a shaft which is connected to a second saucer-shaped body which is anchored to the bottom of a body of water. The second saucer-shaped body contains a generator driven by the rotational movement of the upper saucer-shaped body. The generator can produce either fluid or electrical energy which is conveyed to the shore for use. Another saucer-shaped body with fins can be rotatably mounted below the anchored body to rotate in the opposite direction thereby stabilizing the motor-generator apparatus.

The finned body can be of any suitable streamlined form and can also be driven by air currents. The body can be rotatably mounted on a vehicle, a ship, a building, a tower, etc. to generate power from the passing air flow. Also, the invention is not directional since it will be rotated in the same direction in response to fluid flow from any direction. Thus, it will operate in a current or in response to the tides always rotating in the same direction.

DESCRIPTION OF THE PREFERRED EMBODIMENTS

Figure 1:
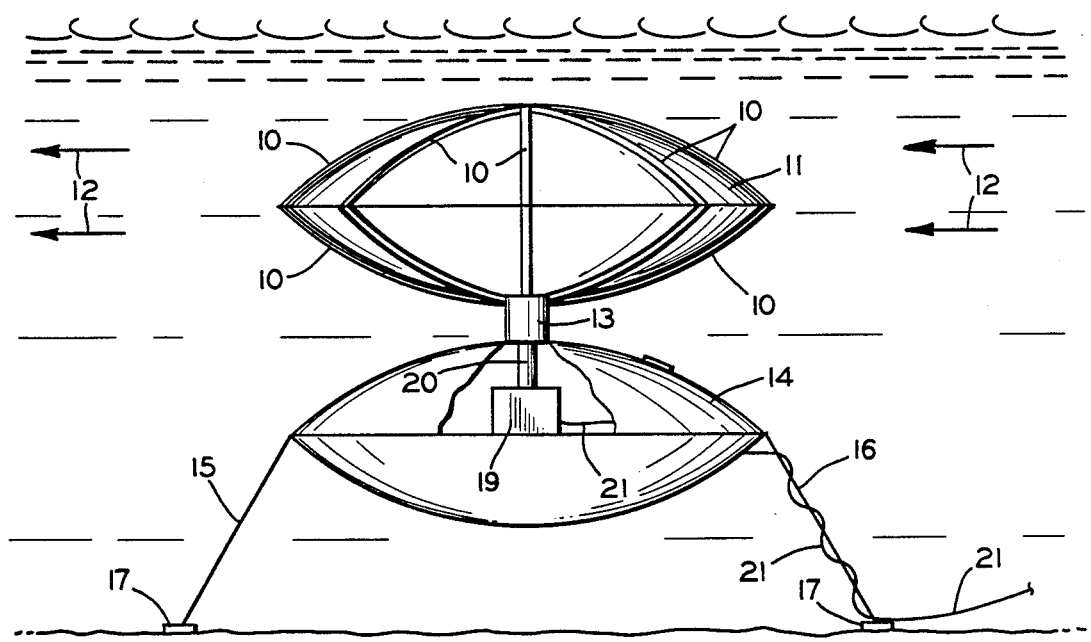
FIG. 1 is a front elevational view of a motor-generator apparatus according to the present invention submerged in a body of water.

There is shown in FIG. 1 a front elevational view of a fluid powered motor-generator apparatus according to the present invention. A plurality of radially extending fin assemblies 10 are mounted on the outer surface of a generally saucer-shaped first or upper body 11. The upper body 11 is typically hollow to minimize weight and can be provided with internal ballast (not shown) to cause the body to be slightly buoyant. The body 11 is configured to present a low resistance to the passage of a current or stream of water represented by the arrows 12. The body shape is also structurally sound and stable for relatively large diameters.

The upper body 11 is rotatably mounted on a connecting stem 13 which extends downwardly in a generally vertical direction and is attached to an upper surface of a lower or second stationary or fixed body 14. The lower body 14 is also generally saucer-shaped to minimize turbulence below the upper body 11. The lower body 14 is anchored to the bottom of the body of water by at least a pair of lines 15 and 16 connected between the lower body 14 and anchor blocks 17 imbedded in the bed of the body of water. The lower body 14 includes a hatch cover 18 to provide access to the interior.

A portion of the outer surface of the lower body 14 has been cut away to reveal a generator device 19 connected to a drive shaft 20 which extends up through the connecting stem 13 and is attached to the upper body 11 for rotation thereby. The generator device 19 can be a hydraulic pump or an electrical generator which converts the mechanical energy supplied by the rotation of the upper body 11 through the drive shaft 20 into fluid or electrical power which is transmitted to shore through a power line 21. The weight of the body 14 is such that it is slightly buoyant and the anchor lines 15 and 16 prevent the upper body 11 and lower body 14 from floating to the surface of the body of water or moving with the current 12.

Figure 2:
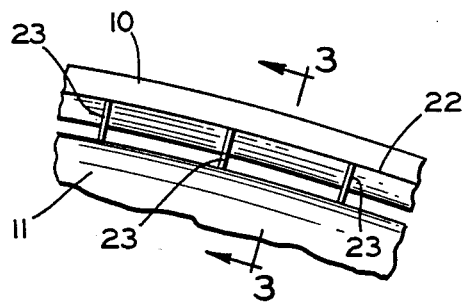
FIG. 2 is an enlarged fragmentary view of a portion of the upper body and one of the fins of the apparatus shown in FIG. 1.
Figure 3:
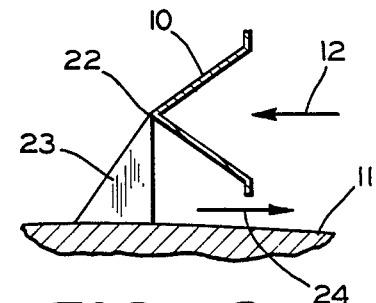
FIG. 3 is a cross-sectional view taken along the line 3—3 of FIG. 2.

There is shown in FIG. 2 an enlarged fragmentary view of a portion of the outer surface of the upper body 11 and one of the fins 10. FIG. 3 is a cross-sectional view taken along the line 3—3 in FIG. 2. Each of the radially extending fins 10 is generally V-shaped in cross-section with a convex side being pointed and a concave side tapering inwardly from spaced apart edges to the point. The point of the V 22 follows the contour of the outer surface of the body 11. All of the fins 10 point in the same direction such that when the interior of the V-shape faces the current 12, as shown in FIG. 3, the moving water exerts a force which tends to rotate the upper body 11 in the direction of the current 12.

The fins 10 are spaced above the outer surface of the upper body 11 and attached thereto by a plurality of support brackets 23 connected to the fins 10 at the point 22. Thus, when the outer surface of the V-shape of the fin 10 faces into the current as shown by the arrow 24, the water will flow around the fin 10 with some of the water directed between the fin 10 and the outer surface of the body 11. The fins 10 will present a lowered resistance when the point 22 faces into the current.

Figure 4:
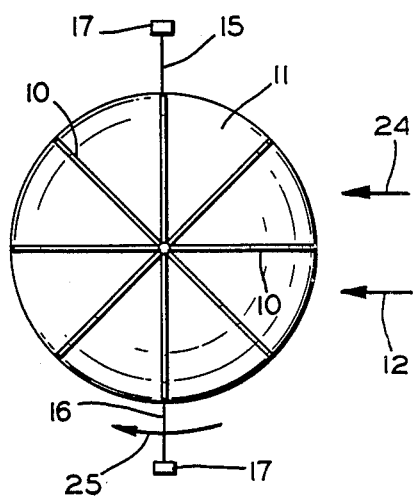
FIG. 4 is a top plan view of the apparatus of FIG. 1.

As shown in FIG. 4, the increased resistance of the fin when the open portion of the V-shape faces the current 12 and the decreased resistance when the point 22 faces the current 24 generates an imbalance which tends to rotate the upper body 11 in the direction of the arrow 25. The upper body 11 will continue to rotate in the direction of the arrow 25 no matter from which direction it is subjected to current flow.

Figure 5:
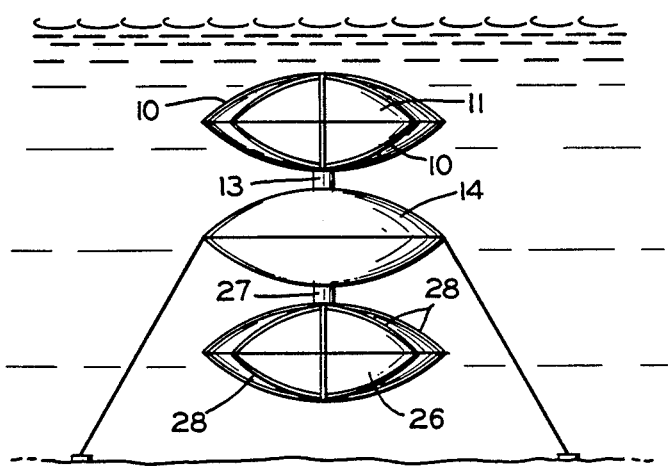
FIG. 5 is a front elevational view of an alternate embodiment of the apparatus shown in FIG. 1.

There is shown in FIG. 5 an alternate embodiment of the fluid powered motor-generator apparatus according to the present invention. Another or third saucer-shaped body 26 can be positioned below the second body 14. The body 26 is rotatably mounted on a connecting stem 27 which is attached to the body 14. Radially extending fins 28 are attached to the outer surface of the body 26. The fins 28 are similar to the fins 10 but are oriented in the opposite direction such that the rotating body 26 will rotate in the opposite direction from the first rotating body 11. The counter rotating bodies 11 and 26 will then balance out the torque applied to the fixed body 14 and tend to stabilize the entire apparatus. It may be desirable to fashion the fixed body 14 with a larger diameter than the bodies 11 and 26 to house the additional generating equipment which could be driven by such an apparatus. Also, additional rotating bodies could be attached above and below the bodies 11 and 26 respectively in deeper water locations.

The fluid powered motor-generator apparatus according to the present invention can be installed anywhere that a fluid current is present. If water is the source of power, the apparatus can be installed in the ocean or a river. For example, near the Florida Keys, the Gulf stream is approximately forty-eight miles wide and flows at approximately five miles per hour to create a large source of energy for driving the present invention. The saucer-shaped body has inherent structural rigidity and requires very little internal bracing. Thus, the body could be as much as one thousand feet in diameter to develop enormous power from high torque at low speed. The fins on both the upper and lower surfaces provide maximum thrust. Wherein most fluid powered generators depend upon high speed for generating power, the present invention depends upon torque.

If wind is the source of power, the apparatus can be installed on a fixed object such as the roof of a house or a moveable object such as the top of an automobile or the mast of a ship. When the rotating body is attached to a building or a vehicle, the stationary body 14 will not be required as the generator apparatus could be housed in the building or vehicle structure. Also, the rotating body could be provided with means for raising and lowering it to permit selective positioning in the wind stream. The rotating body 11 could also be mounted on a derrick-like tower for use under water or on the land.

Figure 6:
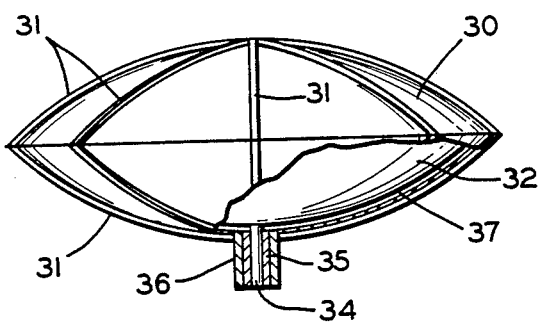
FIG. 6 is a front elevational view of another alternate embodiment of the apparatus shown in FIG. 1.

In a water environment, it may be desirable to provide protection against leakage. Referring to FIG. 6, an outer body 30 has a plurality of fins 31 attached thereto. The outer body 30 encloses an inner body 32 which has a similar shape, but is smaller in diameter. The inner body 32 is attached to a central or inner connecting stem 34. The stem 34 is surrounded by a tubular drive shaft 35 which is attached to the outer body 30. The stem 34 and the drive shaft 35 are enclosed by an outer stem 36. The outer stem 36 is adapted to be attached to a stationery lower body such the body 14 of FIG. 1. The drive shaft 35 performs a function similar to the drive shaft 20 shown in FIG. 1. The inner stem 34 can be attached to the inner structure of a lower body such as lower body 14 to hold the inner body 32 stationery with respect to the rotating outer body 30. The outer body 30 and the inner body 32 define a space 37 therebetween. Thus, if the outer body 30 develops a leak, the inner body 32 will prevent water from filing most of the interior of the rotating outer body 30. Thus, the entire structure will remain buoyant.

Figure 7:
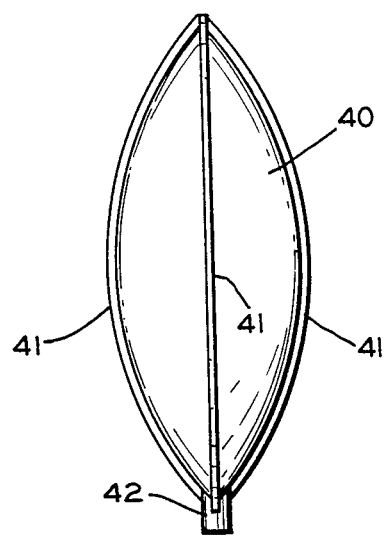
FIG. 7 is a front elevational view of a third alternate embodiment of the apparatus shown in FIG. 1.

There is shown in FIG. 7 an alternate embodiment of the apparatus shown in FIG. 1. In FIG. 1, the diameter of the body 11 is substantially greater than the height. This ratio can be varied in accordance with the dimensions of the location in which the apparatus will be operated. For example, in a relatively deep, narrow channel of water, a body 40 as shown in FIG. 7 would be suitable. The height of the body 40 is substantially greater than its diameter. The body 40 has a plurality of fins 41 formed thereon and is rotatably mounted on a stem 42 for attachment to a suitable structure. Thus, the rotating body can be of any streamlined shape, for example a sphere, with radially extending fins.

Figure 8:
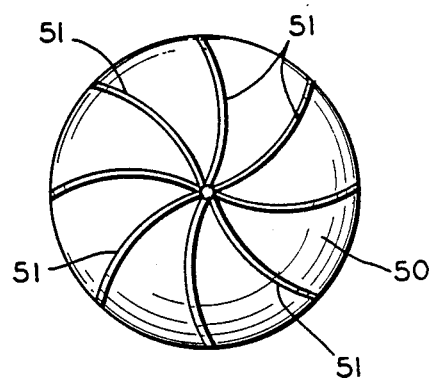
FIG. 8 is a top plan view of a fourth alternate embodiment of the apparatus shown in FIG. 1.

There is shown in FIG. 8 a top plan view of a further alternate embodiment of the apparatus shown in FIG. 1. A generally saucer-shaped body 50 has a plurality of fins 51 formed on an outer surface thereof. However, the fins 51 are formed in spiral fashion as compared with the straight fins 10 shown in FIG. 4.

Figure 9:
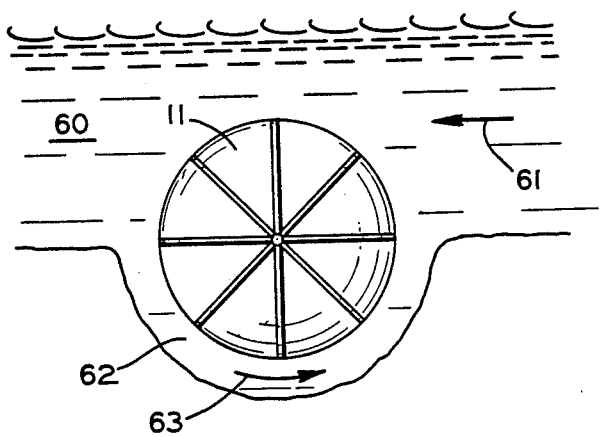
FIG. 9 is a top plan view of the apparatus of FIG. 1 installed in a river.

When the present invention is utilized in a river, it can be installed such that only one half of the body is in the main current. For example, as shown in FIG. 9, the body 11 is located in a river 60 in which a current is flowing in the direction of an arrow 61. If the bank of the river is indented to create a pocket of water as at 62, a counter flowing current or eddy is created in the direction of an arrow 63. When one half of the body 11 is located in the pocket 62, the main current and the counter current will aid one another in driving the body 11. A plurality of such installations could be located along a river to generate power for a city and/or manufacturing operations. Heat or bubbling could be utilized to prevent ice formation when necessary.

The present invention has many uses. It could replace a windmill as a source of power for pumping irrigation water. For use in the air, the body could be shaped with a relatively light weight frame which could be covered with a strong light fabric. The fabric could be of the type which is heat shrinkable over the frame.

Figure 10:
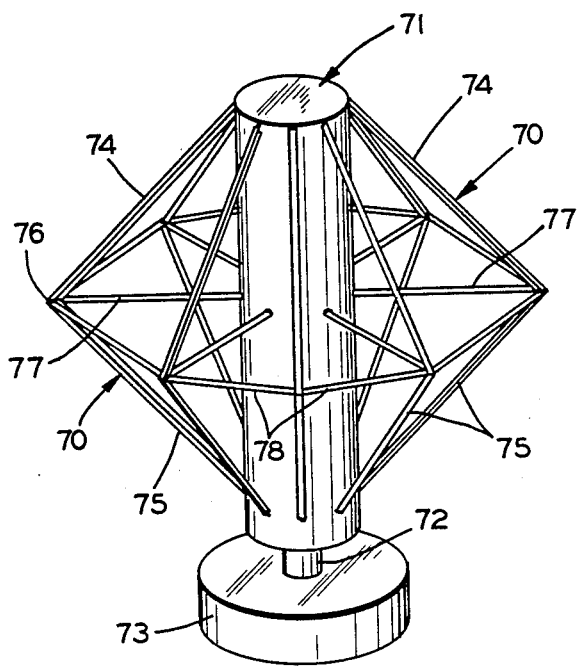
FIG. 10 is a perspective view of fifth alternate embodiment of the apparatus shown in FIG. 1.
Figure 11:
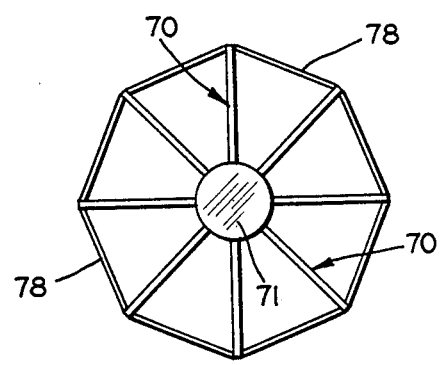
FIG. 11 is a top plan view of the apparatus shown in FIG. 10.

There is shown in FIGS. 10 and 11, a fifth alternate embodiment of a fluid-powered motor-generator apparatus according to the present invention. A plurality of radially extending fin assemblies 70 are mounted on the outer surface of a generally streamlined body 71 which is in the shape of a right circular cylinder. The body 71 has its longitudinal axis oriented generally vertically and is rotatably mounted on a shaft 72 which extends into a base 73. As will be described, the body 71 is rotated to generate power in the desired form. For example, the body 71 could be rotatably mounted on the shaft 72 which is fixed with respect to the base 73. The body 71 could be connected to drive a generator (not shown) similar to the generator 19 of FIG. 1 to produce electrical power. In the alternative, the body 71 can be attached to the shaft 72 for co-rotation therewith to drive a generator located in the base 73.

The fin assemblies 70 are each formed of a pair of fins 74 and 75, each fin having one end attached to the base 71 and the opposite ends attached together at a junction 76. The ends of the fins 74 and 75 attached to the body 71 are spaced apart such that the fins 74 and 75 form an angle with respect to one another which preferably is ninety degrees, but can be of any suitable configuration. The fins 74 and 75 are similar to the fins 10 of FIGS. 1-3. Although eight are shown, any number of fin assemblies 70 can be attached to the body 71. Although the fin assemblies 70 may be able to support themselves against the fluid forces applied to them, additional bracing can be provided. For example, a brace member 77 can be connected between the junction 76 and the body 71 in each of the fin assemblies 70. Also, an exterior brace member 78 can be connected between the junctions 76 of adjacent ones of the fin assemblies 70 as is shown.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. A fluid powered motor-generator apparatus comprising:
    a generator means having a mechanically actuated input and a power output;
    a geneally streamlined motor body rotataly mounted with a generally vertical axis of rotation and connected to drive said generator means input;
    a plurality of radially extending fins attached to an outer surface of said motor body, each of said fins having opposite ends positioned adjacent spaced apart points along said generally vertical axis of rotation and having a convex side oriented in the direction of rotation of said motor body and concave side oriented in the opposite direction whereby said motor body rotates about its axis of rotation to drive said generator when exposed to a fluid current flow at an angle with respect to said axis of rotation; and
    bracket means attached between said outer surface of said motor body and each of said fins for spacing said fins from said motor body to permit fluid to flow between said fins and said motor body.

2. The apparatus according to claim 1 wherein said generator means is a hydraulic pump driven by said motor body at said input and supplying pressured hydraulic fluid at said power output.

3. The apparatus according to claim 1 wherein said generator means is an electrical generator driven by said motor body at said input and supplying electrical energy at said power output.

4. The apparatus according to claim 1 wherein said fins are generally V-shaped with said convex side being pointed and said concave side tapering inwardly from spaced apart edges to said point.

5. The apparatus according to claim 1 wherein said fins are generally V-shaped with said convex side being pointed and said bracket means are attached to said fins at said pointed side.

6. The apparatus according to claim 1 wherein said generator means includes a generally streamlined body and a stem, said stem having one end attached to said generator means body and an opposite end rotatably connected to said motor body.

7. The apparatus according to claim 1 wherein said motor body is buoyant relative to a body of fluid and including means for anchoring said motor body in a current flow of said body of fluid.

8. The apparatus according to claim 1 wherein said motor body includes an inner body enclosed within an outer body, said fins being attached to an outer surface of said outer body, said outer body being rotatably mounted with respect to said inner body.

9. The apparatus according to claim 1 wherein the diameter of said motor body is substantially greater than the height of said motor body.

10. The apparatus according to claim 1 wherein the height of said motor body is substantially greater than the diameter of said motor body.

11. The apparatus according to claim 1 wherein said fins extend radially along curved paths.

* * * * *